US009477695B2

(12) United States Patent
Antova et al.

(10) Patent No.: US 9,477,695 B2
(45) Date of Patent: *Oct. 25, 2016

(54) METADATA CACHE SUPPORTING MULTIPLE HETEROGENEOUS SYSTEMS

(71) Applicant: EMC Corporation, Hopkinton, MA (US)

(72) Inventors: Lyublena Antova, Sunnyvale, CA (US); Florian Waas, San Francisco, CA (US); Sivaramakrishnan Narayanan, Sunnyvale, CA (US); Venkatesh Raghavan, Sunnyvale, CA (US); Mohamed Soliman, Foster City, CA (US); Konstantinos Krikellas, San Mateo, CA (US)

(73) Assignee: EMC Corporation, Hopkinton, MA (US)

( * ) Notice: Subject to any disclaimer, the term of this patent is extended or adjusted under 35 U.S.C. 154(b) by 396 days.

This patent is subject to a terminal disclaimer.

(21) Appl. No.: 14/174,684

(22) Filed: Feb. 6, 2014

(65) Prior Publication Data

US 2014/0195553 A1    Jul. 10, 2014

Related U.S. Application Data

(63) Continuation of application No. 13/334,853, filed on Dec. 22, 2011, now Pat. No. 8,688,703.

(51) Int. Cl.
*G06F 7/00*      (2006.01)
*G06F 17/30*    (2006.01)

(52) U.S. Cl.
CPC ... *G06F 17/30289* (2013.01); *G06F 17/30569* (2013.01)

(58) Field of Classification Search
CPC .................................................. G06F 2212/603
USPC ................... 711/118; 707/713, 736; 713/193
See application file for complete search history.

(56) References Cited

U.S. PATENT DOCUMENTS 6,732,124 B1 *  5/2004  Koseki ............... G06F 11/1435
7,996,427 B1 *  8/2011  Flick ................. G06F 17/30997
                                                                707/792

(Continued)

OTHER PUBLICATIONS

Shi, K., A Replication and Cache based Distributed Metadata Management System for Data Grid, Eighth ACIS International Conference on Software Engineering, Artificial Intelligence, Networking, and Parallel/Distributed Computing, pp. 20-25m 2007.*

(Continued)

*Primary Examiner* — Cheyne D Ly
(74) *Attorney, Agent, or Firm* — Barry N. Young

(57) ABSTRACT

A request for a metadata object is received where the request includes an identifier. It is determined whether the metadata object is stored in a metadata cache, including by: selecting a sub-cache in the metadata cache based at least in part on the identifier and determining whether the metadata object is stored in that sub-cache. If it is determined the metadata object is not in the metadata cache, a request (in a format associated with the source) to obtain the metadata object is sent to a source with which the metadata object is associated. If the metadata object provided by the source is in a native format which is not the same as the common format, the metadata object is transformed from the native format into the common format. Access to the metadata object in the common format is provided.

28 Claims, 9 Drawing Sheets

(56) References Cited

U.S. PATENT DOCUMENTS

2008/0313225 A1* 12/2008 Spicer ............... G06F 17/30876
2009/0037416 A1* 2/2009 Raghavan ......... G06F 17/30362
2009/0112808 A1* 4/2009 Howcroft .......... G06F 17/30038

OTHER PUBLICATIONS

Shriraman et al., ISCA'10, Jun. 19-23, pp. 407-418, 2010, Saint-Malo, France.*

* cited by examiner

METADATA CACHE SUPPORTING MULTIPLE HETEROGENEOUS SYSTEMS

CROSS REFERENCE TO OTHER APPLICATIONS

This application is a continuation of co-pending U.S. patent application Ser. No. 13/334,853, entitled METADATA CACHE SUPPORTING MULTIPLE HETEROGENEOUS SYSTEMS filed Dec. 22, 2011 which is incorporated herein by reference for all purposes.

BACKGROUND OF THE INVENTION

FIG. 1 is a diagram showing an example of a monolithic data management system. In the example shown, monolithic data management system 100 includes a database (102) and metadata about the database (104). Queries (also referred to as instructions or operations) are performed on database 102 using parser 106, planner 108, and executor 110. Parser 106 assembles a raw query, planner 108 optimizes the raw query using metadata 104, and executor 110 executes the optimized query on database 102. System 100 is monolithic in that functionality performed by (for example) planner 108 is tightly coupled to the specific implementation of database 102 and/or metadata 104. New data management systems may be desirable as they may have new features or capabilities not available in existing data management systems.

BRIEF DESCRIPTION OF THE DRAWINGS

Various embodiments of the invention are disclosed in the following detailed description and the accompanying drawings.

DETAILED DESCRIPTION

Figure 1:
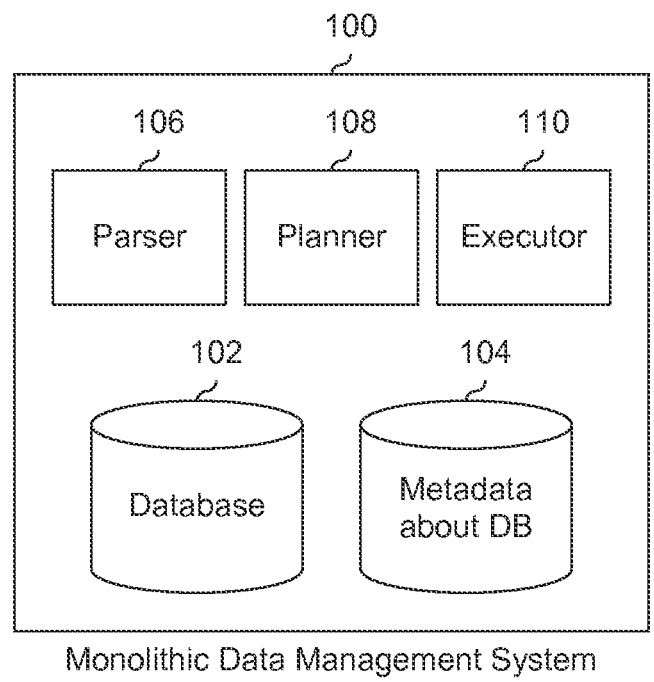
FIG. 1 is a diagram showing an example of a monolithic data management system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A metadata cache which stores metadata associated with one or more data management systems is described. The associated data management systems may be of the same type (e.g., a homogenous environment), or may include a variety of system types (e.g., a heterogeneous environment). In various embodiments, metadata may be transformed or mapped from how it is stored and represented natively (e.g., on a source data management system or in a source file) into a format or framework that is common to multiple forms used to represent and describe metadata. For example, some systems are relational databases whereas others are not, some have a framework for or the concept of user-defined schemes, data structures and/or functions whereas others do not. Metadata in various frameworks and formats such as those are transformed or mapped to the common format. In some embodiments, the common format is one employed by one of the data management systems. In some other embodiments, the common format is not used by any of the data management systems. If some requested metadata is not stored in the cache, then that metadata is retrieved, transformed as needed (e.g., by an associated metadata provider configured to communicate with that particular type of data management system) to the common format. One benefit of such a system is a performance improvement. For those pieces of metadata in the cache (i.e., a "hit"), metadata is more readily accessible than (for example) having to retrieve it from a remote device via a network. Another benefit is that functions which use the metadata stored in the cache can be decoupled from the specific implementations of the various data management systems. For example, if the metadata stored in the cache is used by a planner to optimize a query, then the planner can be implemented using the common metadata format and not be tightly coupled to one specific implementation.

Figure 2A:
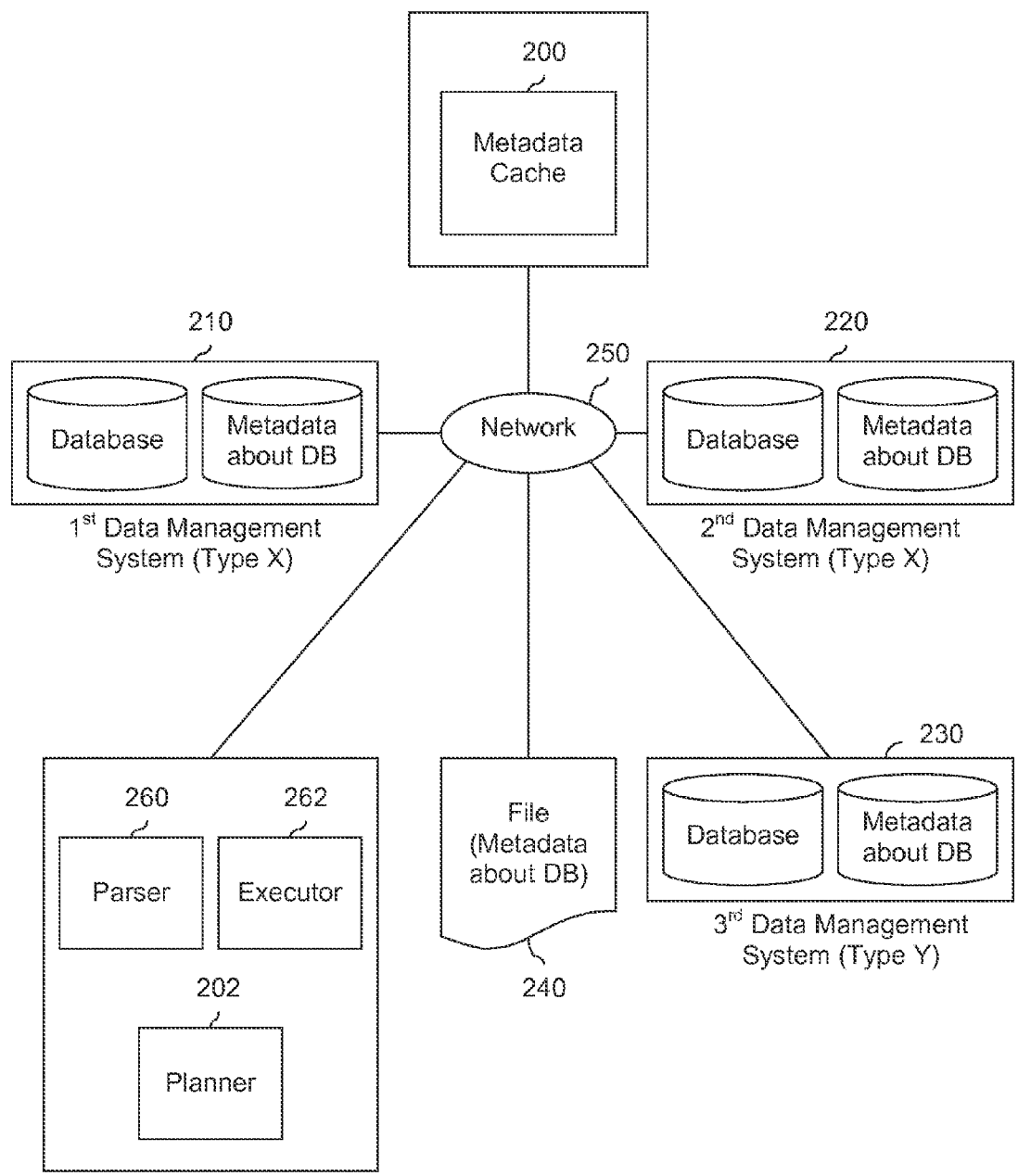
FIG. 2A is a diagram illustrating an embodiment of a metadata cache used by a planner to optimize queries targeting data management systems.

FIG. 2A is a diagram illustrating an embodiment of a metadata cache used by a planner to optimize queries targeting data management systems. In the example shown, planner 202 and metadata cache 200 are located on the same device. Via a network (250), a first data management system (210), a second data management system (220), and a third data management system (230) are accessible to the planner (202) and the metadata cache (200). Each of the data management systems includes a database and metadata describing the associated database. In this particular example, the first and second data management systems (210 and 220) are of a first type (i.e., Type X) and the third data management system (230) is of a different type (i.e., Type Y). A data management system may be any system for storing and/or managing data. Some examples include file systems and databases.

Metadata, in general, is information about data. Some examples of metadata associated with a data management system include characteristics, structures, or properties of the data stored in and/or managed by a data management system. Metadata may be about the sources of data in a data management system (e.g., tables in a database, files in a file system, etc.). Metadata may describe types of data (e.g., a string versus an integer) or how data is organized or otherwise structured (e.g., as arrays, tables, trees, etc.). Metadata may be related to operations, such as specifying an operand or result type. Metadata may describe relationships, for example, between two or more related or linked data objects (e.g., a hierarchical relationship between two objects in a file system tree, a dependent relationship such as between a backup copy and its corresponding original, or a relationship resulting from an association applied to the data objects by an application, such as various electronic medical records relating to the same patient).

In one example of data management systems, the first and second data management systems (210 and 220) are electronic medical records systems associated with two clinic sites of a medical practice. The medical practice implemented medical records at the two sites at the same time, so the same software company implemented both systems and therefore the structure and implementation of the databases and the associated metadata are the same at the two clinic sites. The third data management system (230) may be that of an off-site and/or third-party laboratory. Test orders and test results (e.g., an order for a blood test for patient John Doe and the corresponding lab results) are stored in data management system 230 but the medical records for patient John Doe (e.g., a doctor's summary of an office visit and prescribed medication resulting from the office visit) are stored in the first or second data management system (210 or 220).

Also connected to network 250 are file 240, parser 260 and executor 262. Parser 260 is configured to assemble raw queries targeting one or more of data management systems 210, 220 and 230. Planner 202 receives a raw query from parser 260 and optimizes the query using metadata stored in metadata cache 200. The optimized query is then returned to executor 262 which executes the query against the target data management system(s) (i.e., one or more of data management systems 210, 220 or 230). In some embodiments, multiple queries are processed simultaneously. Although this example describes planner 202 as a client of the metadata cache, in various embodiments other clients may be a parser, executor, language binder, etc.

Although the example system shown herein shows two data management systems of a first type and a single data management system of a second type, any number of total systems and/or number of system types may be used in combination with the techniques described herein. Some example types of data management systems (e.g., 210, 220 and 230) include EMC Greenplum databases, Oracle databases, MySQL, Hadoop, MapReduce, file systems, etc.

As an example of a query that targets a single data management system, parser 260 generates a raw query to retrieve all unbilled lab tests performed in the previous month from the laboratory (e.g., data management system 230). Planner 202 in that example uses metadata, from metadata cache 200, associated with data management system 230 to optimize the query.

In an example where a query targets multiple data management systems, a query is generated to flag a latex allergy for patient John Doe. To make the staff at the laboratory and the patient's home clinic aware of this allergy, at least two of the data management systems are targeted by the query. As such, metadata associated with those data management systems is retrieved from metadata cache 200 and is used by planner 202 to optimize the raw query.

In some cases, two queries are simultaneously optimized by planner 202 and the targets overlap. For example, at the same time planner 202 is optimizing the query to flag the latex allergy for patient John Doe, another query is being optimized to place an order for a skin prick allergy test.

In addition to "live" data management systems, metadata cache 200 is configured to work with metadata stored in a file, such as file 240. As with metadata from a data management system, metadata from file 240 is transformed as needed into the common format and stored in metadata cache 200.

The ability to operate on metadata stored in a file has a number of benefits. In one example scenario, a data management system is configured to write state information (including metadata) to a file in the event of a system failure or crash. Using the resulting file, debugging can be performed by accessing the metadata stored in the file via metadata cache. Debugging can also be performed without having access to the actual system. In some cases, a data management system can be instructed (e.g., by a system administrator) to do a file write independent of a system failure, for example, so that a vendor can recreate a customer's system environment for system analysis and/or optimization. Although the system shown in the figure describes using metadata cache 200 to optimize queries (e.g., at planner 202 in this example), the metadata accessible via metadata cache 200 may be used for any purpose, not just optimization. Another benefit to a metadata cache being able to import metadata from a file is that during development, new products can be tested using a simulated environment. For example, rather than using a data management system (and possibly risking client information), file 240 can be used to test the performance of a new product.

Metadata providers (not shown) in metadata cache 200 are responsible for retrieving metadata from a data management system and performing the transforming to a common format. The following figure describes metadata providers in further detail.

Figure 2B:
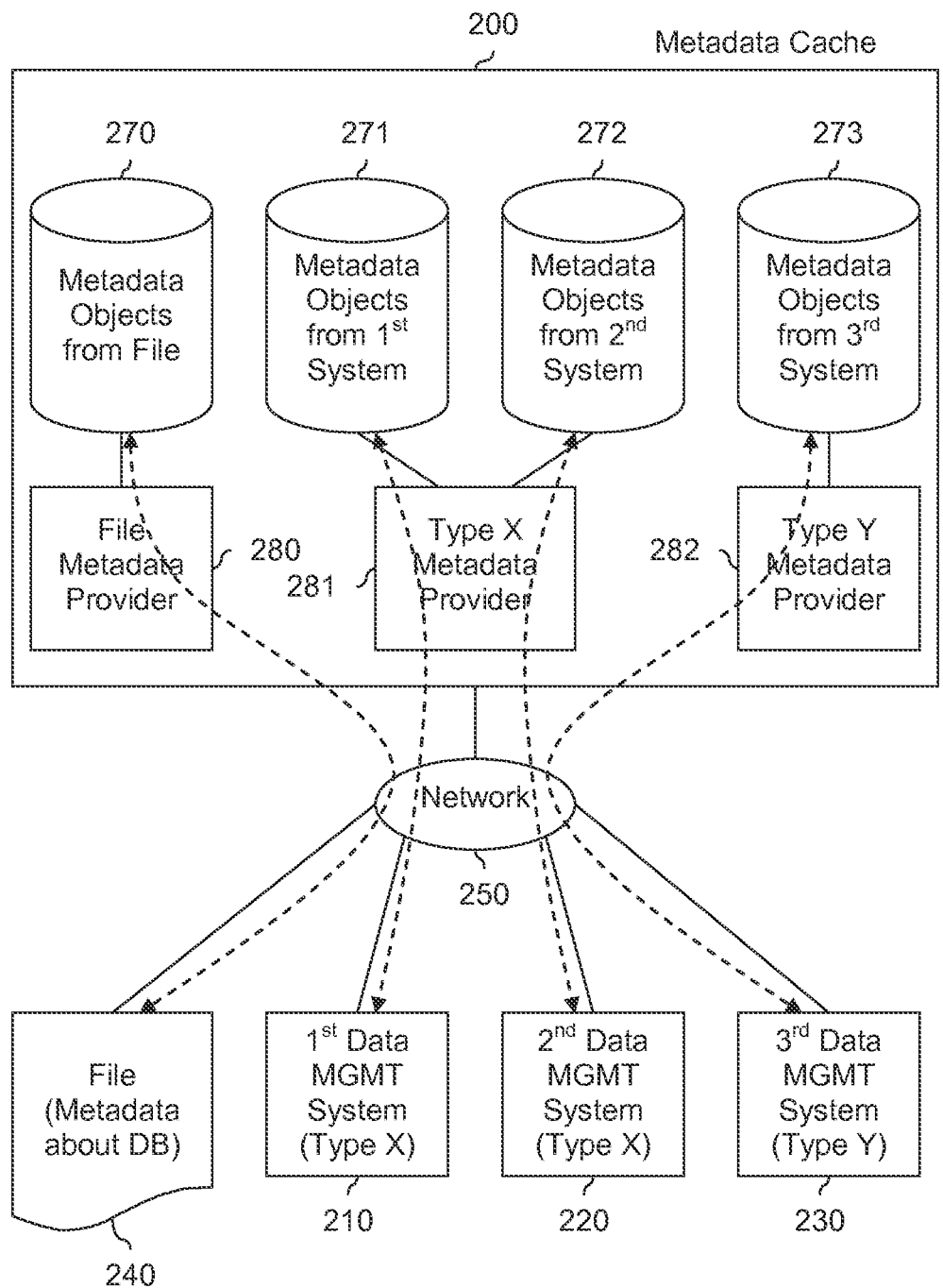
FIG. 2B is a diagram illustrating a more detailed embodiment of a metadata cache, including metadata providers.

FIG. 2B is a diagram illustrating a more detailed embodiment of a metadata cache, including metadata providers. In the example shown, each type of data management system has a corresponding metadata provider which is configured to perform the processes to access the desired metadata and transform the obtained metadata from its native format to the common format. For example, Type X metadata provider 281 is configured to communicate with data management systems that are of Type X (i.e., data management systems 210 and 220) and Type Y metadata provider 282 is configured to communicate with data management systems that are of Type Y (i.e., data management system 230). In one example, metadata provider 281 may be associated with Hadoop databases and metadata provider 282 may be associated with EMC Greenplum databases. Another metadata provider (not shown) may be associated with Oracle databases. Via network 250, Type X metadata provider 281 communicates with first data management system (210) to obtain the desired metadata and then transforms the metadata into a common format and stores it in sub-cache 271. Although this example shows a plurality of sub-caches, in some other embodiments there is a single cache. Type X metadata provider 281 also performs this processing with respect to second data management system 220 and sub-cache 272 and Type Y metadata provider 282 does it with respect to third data management system 230 and sub-cache 273. File metadata provider 280 is configured to perform this accessing and transformation for metadata stored in files. Although only a single file is shown in this example, a file metadata provider may be used in other embodiments with two or more files. In various embodiments, there is one metadata provider per source type, one metadata provider per source instance, etc.

In some embodiments, metadata stored in a metadata cache is read only and the metadata cache is not responsible for updating a corresponding metadata object in a source file or source data management system. For example, if sub-cache 271 includes a metadata object that is being used by an executor (not shown) to execute an optimized query, the executor is not permitted to manipulate the metadata object in sub-cache 271 and/or with the expectation that any such change will be propagated to first data management system 210 on behalf of the executor. In such embodiments, any changes to a metadata object are made directly at the source (e.g., at data management system 210, 220 or 230 using application programming interfaces (APIs) or other interfaces).

Using a plug-in architecture where each type of data management system has a corresponding metadata provider is attractive because the system is easily extensible. If support for a new type of data management system is desired, a new metadata provider configured to communicate with the new data management system and convert the metadata objects from their native format to the common format can be built and installed. Similarly, if an already-supported data management system performs an update (e.g., by adding new metadata objects), then the corresponding metadata provider can be updated as well.

Figure 3:
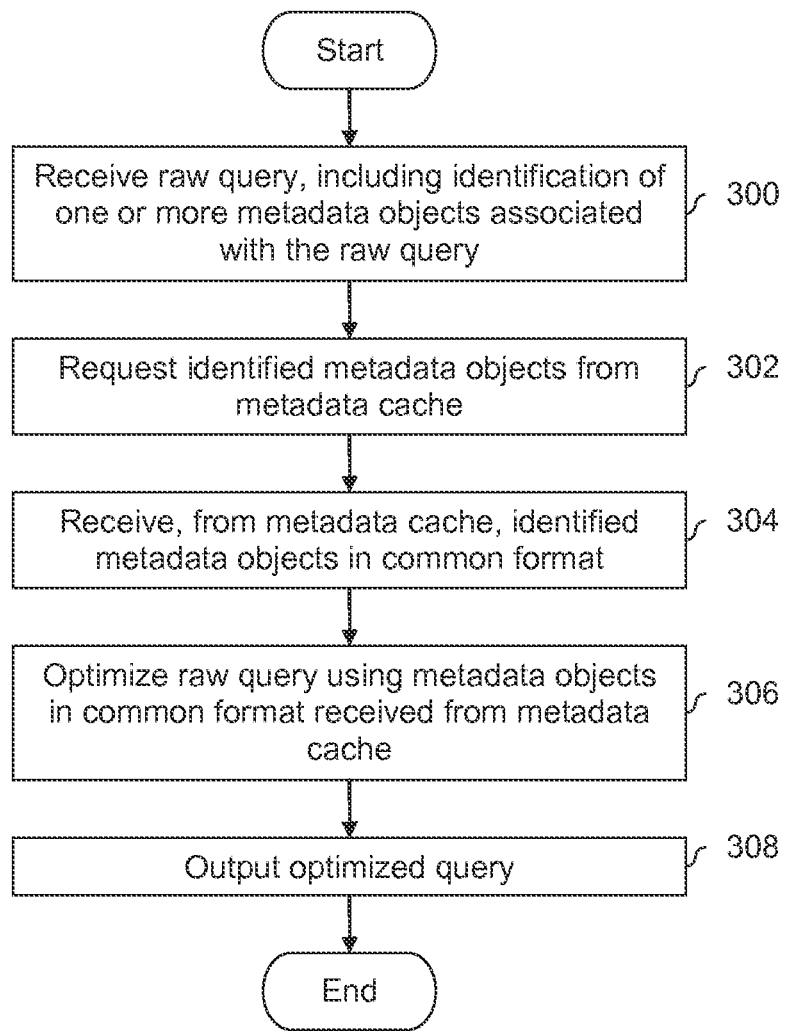
FIG. 3 is a flowchart illustrating an embodiment of a process to optimize database queries targeting one or more data management systems.

FIG. 3 is a flowchart illustrating an embodiment of a process to optimize database queries targeting one or more data management systems. In some embodiments, the process is performed by planner 202 in FIG. 2A. In some other embodiments, metadata objects stored in a metadata cache are used for some other purpose.

At 300, a raw query is received, including identification of one or more metadata objects associated with the raw query. For example, planner 202 in FIG. 2A may receive a raw query to be optimized from parser 260. In various embodiments, various forms of identification are included at 300. In general, included identification uniquely identifies the metadata objects on a global basis so that (for example) if needed, a metadata cache knows which source to go to (e.g., which file or data management system) and what metadata objects to retrieve from that source.

The identified metadata objects are requested from the metadata cache at 302. To uniquely identify the metadata objects to the metadata cache, a request at 302 may include the metadata object identifiers received at 300. Alternatively, some mapping between the identification received at 300 and that used at 302 may be performed.

At 304, the identified metadata objects are received from the metadata cache in common format. With respect to cache hits and cache misses, there is no behavioral difference between a cache hit or a cache miss from the point of view of a planner (or any other process which accesses metadata from a metadata cache) when data is received at 304. If the identified metadata is not stored in the metadata cache, then the corresponding metadata provider is used to access those metadata objects and transform them as needed in a manner that is transparent to the planner.

The raw query is optimized using the metadata objects in the common format received from the metadata cache at 306. The metadata objects received at 304 and used at 306 are in the common format which permits the planner to operate in a manner that is not necessarily coupled to a specific database implementation.

At 308, the optimized query is output. For example, in FIG. 2A, an optimized query may be sent from planner 202 to executor 262 for execution against the appropriate target. For debugging (e.g., when metadata from file 240 in FIG. 2 is used), the optimized query may be sent to a debugger for presentation to and/or manipulation by a system administrator.

In some embodiments, when a process (such as a planner) accesses a metadata object from a metadata cache, the metadata objects being accessed are locked or pinned to prevent those metadata objects from being removed from the cache before the planner or other process is finished with those metadata objects. Unlocking may occur when the process is done with the metadata object (e.g., upon completion of the process) or if there is some other exit or conclusion to the process (such as an error event). In some embodiments, such locking or pinning is accomplished using metadata accessors. In such embodiment, all accesses to metadata objects in the metadata cache are performed using a metadata accessor which has the scope of the process (e.g., a planner) and releases the metadata accessors at the end of the process, if not sooner. In some embodiments, there is a many-to-one mapping of metadata accessors to metadata objects. For example, if two queries are associated with the same metadata object then each query will have its own metadata accessor for that metadata object.

Figure 4:
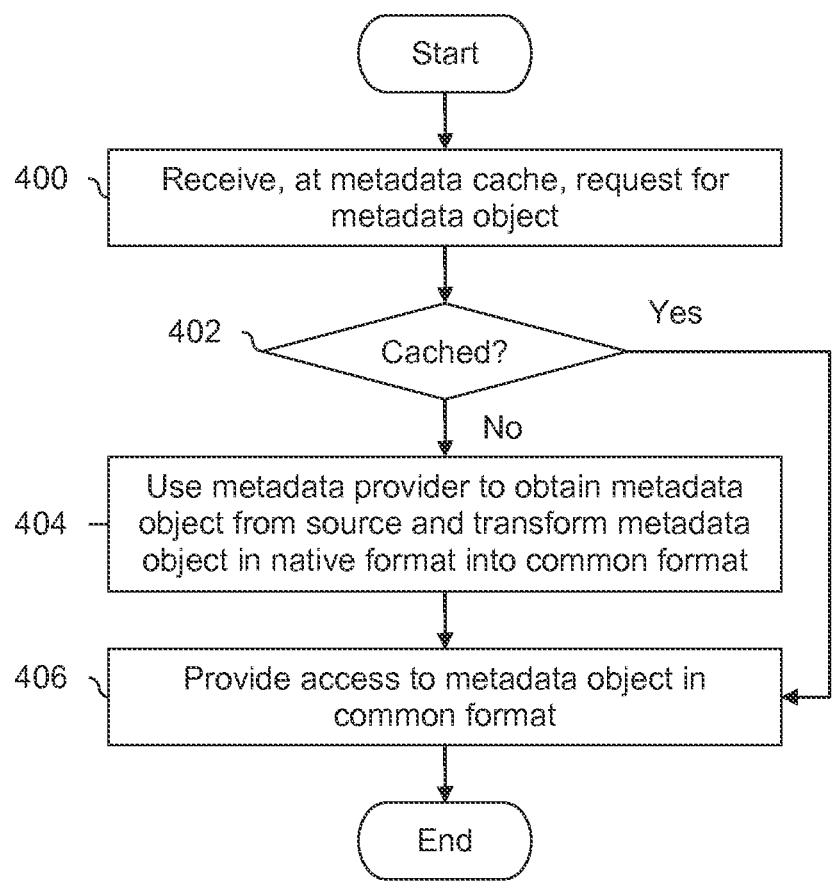
FIG. 4 is a flowchart illustrating an embodiment of a process to service a request for one or more metadata objects stored in a metadata cache.

FIG. 4 is a flowchart illustrating an embodiment of a process to service a request for one or more metadata objects stored in a metadata cache. In some embodiments, metadata cache 200 in FIG. 2A and/or FIG. 2B performs the example process shown.

At 400, a request is received at a metadata cache for a metadata object. For example, in FIG. 2A, planner 202 may be optimizing a query associated with one or more metadata objects, and planner 202 sends a request to metadata cache 200 for those metadata objects.

At 402, it is determined whether the metadata object is cached. In some embodiments, this includes determining which sub-cache a particular metadata object would be stored in, and checking that sub-cache, for example using an identifier included in a request at 700, which is associated with the requested metadata object. For example, in FIG. 2B, it may be determined which of sub-caches 270-273 the requested metadata object is associated with and checking that sub-cache for the requested metadata object. As described above, in some embodiments there is a single cache (for example where all information is stored together) and the example process is modified accordingly.

If it is determined at 402 that a metadata object is cached, then access is provided to the metadata object in a common format at 406. For example, the common format may be a generic or standardized format and in some cases does not exactly match any of the formats or representations as they are organized or represented at the source (e.g., in file 240 or data management systems 210, 220 and 230 in FIG. 2B). In various embodiments, the access is read-only. That is, the metadata cache does not support (e.g., via the metadata object provided at 406) updates to a metadata object as it is stored in a source file or a source data management system. In some embodiments, a metadata accessor or some other technique is used to ensure the metadata object in the common format provided at 406 is not removed or deleted before an application or other entity to which access is provided (e.g., planner 202 in FIG. 2A) is done using the metadata object from the metadata cache.

If it is determined at 402 that a metadata object is not cached, then a metadata provider is used to obtain a metadata object from a source and transform the metadata object in a native format into a common format at 404. In FIG. 2B, for example, if the requested metadata objects associated with sub-cache 270 are available in sub-cache 270 but some other requested metadata objects associated with sub-cache 271 are not available in that sub-cache, then Type X metadata provider 281 is used to communicate with first data management system 210 in order to obtain the desired metadata objects from first data management system 210, transform it to the common format, and store it in sub-cache 271. Access to the metadata object in a common format is then provided at 406.

Figure 5:
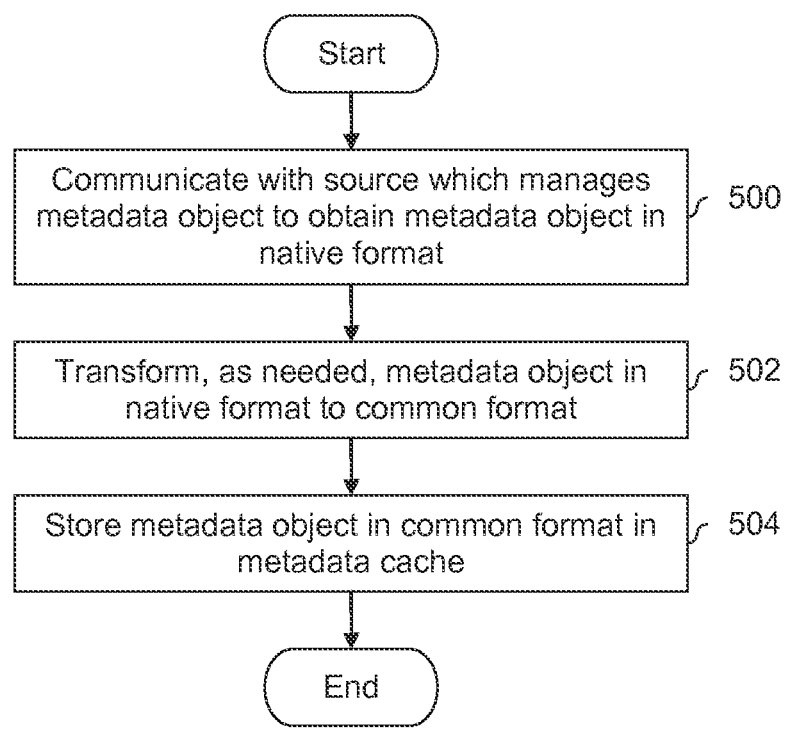
FIG. 5 is a flowchart illustrating an embodiment of a process for using a metadata provider to obtain a metadata object from a source and transform it to a common format.

FIG. 5 is a flowchart illustrating an embodiment of a process for using a metadata provider to obtain a metadata object from a source and transform it to a common format. In some embodiments, the example process is used at step 404 in FIG. 4. In some embodiments, each metadata provider associated with a particular type of source performs the example process shown. For example, each of file metadata provider 280, Type X metadata provider 281, and Type Y metadata provider 282 may perform the example process. In some embodiments, the example process is triggered when one or more desired metadata objects are not stored in a sub-cache managed by the metadata provider.

At 500, a source which manages a metadata object is communicated with to obtain the metadata object in a native format. For example, third data management system 230 may have an API or service for accessing metadata objects and Type Y metadata provider 282 may obtain the desired metadata objects using such an interface. In some embodiments, a metadata provider is responsible for updating multiple sub-caches and step 500 may include determining which source to communicate with. For example, Type X metadata provider 281 is responsible for updating both sub-cache 271 and sub-cache 272, and step 500 may include determining whether to communicate with first data management system 210 or second data management system 220.

At 502, a metadata object in its native format is transformed, as needed, to a common format. For example, a generic or standard format which does not (e.g., perfectly) match any of the native formats may be used. Alternatively, one of the native formats may be used as the common format. The metadata object in the common format is stored in a metadata cache at 504. For example, the metadata (after any transformation) is stored in the appropriate one of sub-caches 270-273 in FIG. 2B.

Figure 6:
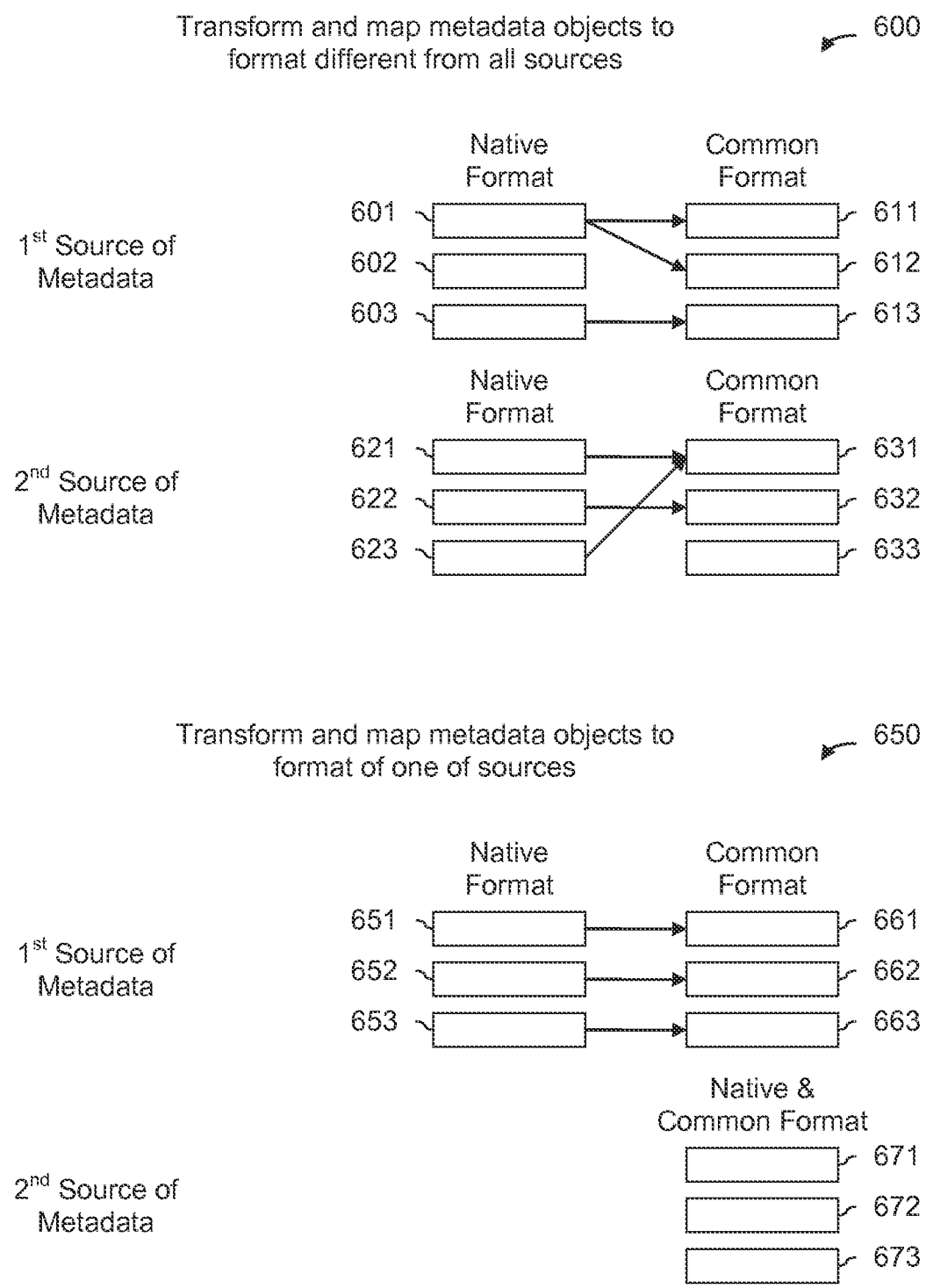
FIG. 6 is a diagram showing two embodiments of transforming metadata objects to a common format.

FIG. 6 is a diagram showing two embodiments of transforming metadata objects to a common format. In the examples shown, diagram 600 shows a first embodiment where metadata objects from two sources are transformed to a format that is different from all of the sources. Diagram 650 shows a second embodiment where metadata objects from two sources are transformed to a format of one of the sources. In various embodiments, a source may be a file or a data management system, such as a file system or a database.

In diagram 600, metadata object 601 from a first source of metadata corresponds to metadata objects 611 and 612 in the common format. In this example, what was previously represented in a single metadata object is now represented using two metadata objects. Metadata object 602 from the first source does not correspond to anything in the common format. In various embodiments, it may have been determined to be redundant (e.g., and the same information can be obtained from another metadata object) or the information is not relevant or needed in the common format. The third metadata object (603) is transformed into metadata object 613 in the common format.

For the second source of metadata, metadata object 621 (in native format) is transformed into metadata object 631. Metadata object 622 is transformed into metadata object 632; metadata object 623 is transformed into 631 (similar to metadata object 621). As is shown in this example, in some cases there is a many to one correspondence during transformation. For example, in the native format, one metadata object may define (e.g., all) data types and another metadata object may define (e.g., all) permitted operations on those data types. In the common format, there may be a metadata object for each data type which also includes functions permitted to be performed on that data type and thus there is a many to one correspondence. As was shown for the first source of metadata in diagram 600, there may also be a one-to-many relationship in some cases.

In diagram 650, the common format is one of the native formats employed by the second source of metadata. As such, transformation of metadata objects 671-673 associated with the second source of metadata is not necessary. Metadata objects 651-653 associated with the first source of metadata are transformed, respectively, into metadata objects 661-663.

In some embodiments, metadata at a source (e.g., file 240 or data management systems 210, 220, or 230) changes. To accommodate this, in some embodiments a metadata cache tracks and/or includes as input/output one or more version numbers. The following figure describes an embodiment of a process performed by a metadata cache where version numbers are used.

Figure 7:
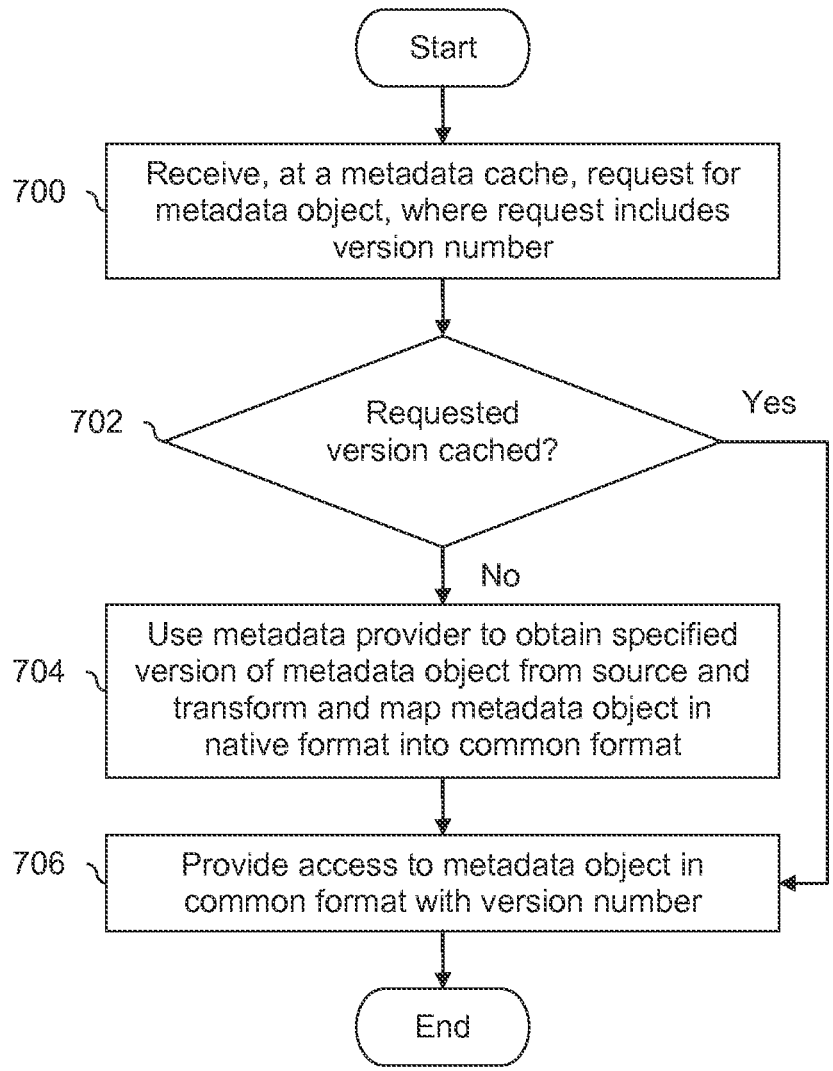
FIG. 7 is a flowchart illustrating an embodiment of a process to service a request for one or more metadata objects stored in a metadata cache, where version numbers are used.

FIG. 7 is a flowchart illustrating an embodiment of a process to service a request for one or more metadata objects stored in a metadata cache, where version numbers are used. In the example shown, some of the steps may be similar to those shown in FIG. 4 and similar techniques may be used.

At 700, a request for a metadata object is received at a metadata cache, where the request includes a version number. A variety of version numbering techniques may used in combination with this technique. In one scheme for example, a version number changes any time anything changes. Put another way, there is a single version number for all of the metadata. On the other end of the spectrum, another scheme may have a version number for each metadata object. Another scheme is a compromise between the previous two schemes with multiple version numbers where each version number tracks a corresponding set of metadata objects. Depending upon the particular versioning scheme, the appropriate version numbers are included in a request at 700. For example, planner 202 in FIG. 2A may include, in a request sent to metadata cache 200, version numbers for desired metadata objects stored in metadata cache 200.

At 702, it is determined whether the requested version of the metadata object is cached. This may include determining which sub-caches to check and checking those sub-caches for the specified version number of the metadata object.

If it is cached at 702, then access is provided to the metadata object in the common format with a version number. For example, metadata cache 200 may return the requested metadata object to planner 202 in FIG. 2A with the version number. In the event the requested version of the metadata object is not found by the metadata cache/metadata provider at 706, it is left up to the clients (e.g. planner 202) to determine the appropriate course of action. The requesting entity (e.g., planner 202) may decide to request the metadata objects again with the same version number, or may decide that a different version of the metadata objects is sufficient. In either case, it is left up to the requesting entity (or another, higher level entity such as an application which initiated a query being optimized) to determine the appropriate course of action. Metadata cache 200 does not (at least in this embodiment) determine whether the returned version is the most current version and, if not, what is the appropriate course of action in such cases.

If it is not cached at 702, then a metadata provider is used to obtain the specified version of the metadata object from the source and transform the metadata object in native format into a common format at 704. For example, Type Y metadata provider 282 may provide an identifier for a desired metadata object, along with a version number for that metadata object to third data management system 230 in FIG. 2B. After using the appropriate metadata provider at 704 to obtain the specified version of the metadata object at 704, access is provided at 706.

Figure 8:
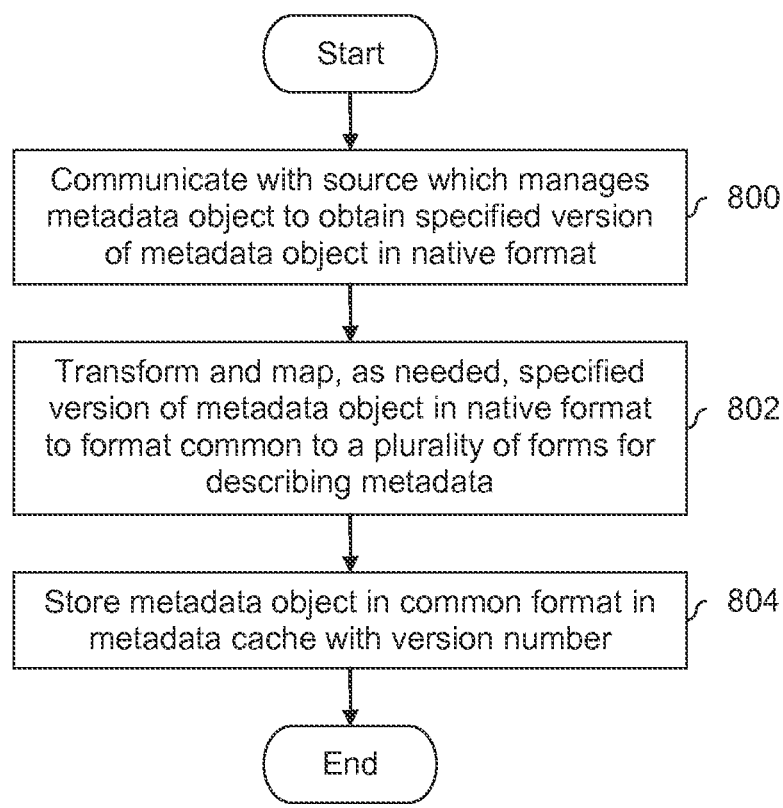
FIG. 8 is a flowchart illustrating an embodiment of a process for using a metadata provider to obtain a metadata object from a source using version numbers.

FIG. 8 is a flowchart illustrating an embodiment of a process for using a metadata provider to obtain a metadata object from a source using version numbers. In some embodiments, step 704 in FIG. 7 is performed using the example process. In some embodiments, some of the steps are similar to that shown in FIG. 5 and similar techniques may be used. In some embodiments, the process is triggered if a specified version of a metadata object is not stored in a metadata cache (e.g., in a sub-cache corresponding to a particular source).

At 800, a source which manages a metadata object is communicated with to obtain a specified version of a metadata object in a native format. For example, if a specific version of a metadata object is not stored in sub-cache 270, then file metadata provider 280 communicates with file 240 in FIG. 2B. At 802, the specified version of the metadata object in the native format is transformed, as needed, into a format common to a plurality of forms for describing metadata. For example, sub-caches 270-273 may use a common framework or format for describing metadata even though sources 210, 220, 230, and 240 may not necessarily have a common metadata framework or format. At 804, the metadata object in the common format is stored in a metadata cache with the version number. For example, a metadata object obtained from file 240 in FIG. 2B may be stored (after any transformation into the common format) in sub-cache 270 with a version number. Storing a version number enables the metadata cache to know whether or not a specific version of a metadata object is located in the metadata cache (e.g., the next time a request comes in).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor; and
a memory coupled with the processor, wherein the memory is configured to provide the processor with instructions which when executed cause the processor to:
receive a request for a metadata object, wherein the request includes an identifier;
determine whether the metadata object is stored in a metadata cache, including by:
selecting one of a plurality of sub-caches in the metadata cache based at least in part on the identifier; and
determining whether the metadata object is stored in the selected sub-cache;
in the event it is determined the metadata object is not stored in the metadata cache, send, to a source with which the metadata object is associated, a request, in a format associated with the source, to obtain the metadata object;
transform the metadata object from a native format of the source into a common format, if the metadata object as provided by the source is in a native format that is not the same as the common format; and
provide access to the metadata object in the common format.

2. The system of claim 1, wherein the metadata cache includes one or more of the following: metadata objects associated with a plurality of data management systems or metadata objects associated with a plurality of types of data management systems.

3. The system of claim 1, wherein the instructions for transforming include instructions for mapping a single metadata object in the native format of the source to a plurality of metadata objects in the common format.

4. The system of claim 1, wherein a query associated with a data management system is processed using the metadata object in the common format.

5. The system of claim 4, wherein the query is processed by one or more of the following: a parser, a planner, an executor, or a language binder.

6. The system of claim 1, wherein there is a plurality of metadata providers, each of which is configured, for a respective type of source, to send and transform for that source type.

7. The system of claim 1, wherein there is a plurality of metadata providers, each of which is configured, for a respective instance of a source, to send and transform for that source instance.

8. A computer program product, the computer program product being embodied in a non-transitory computer readable storage medium and comprising computer instructions for:
receiving a request for a metadata object, wherein the request includes an identifier;
determining whether the metadata object is stored in a metadata cache, including by:
selecting one of a plurality of sub-caches in the metadata cache based at least in part on the identifier; and
determining whether the metadata object is stored in the selected sub-cache;
in the event it is determined the metadata object is not stored in the metadata cache, sending, to a source with which the metadata object is associated, a request, in a format associated with the source, to obtain the metadata object;

transforming the metadata object from a native format of the source into a common format, if the metadata object as provided by the source is in a native format that is not the same as the common format; and providing access to the metadata object in the common format.

9. The computer program product of claim 8, wherein the metadata cache includes one or more of the following: metadata objects associated with a plurality of data management computer program products or metadata objects associated with a plurality of types of data management computer program products.

10. The computer program product of claim 8, wherein the computer instructions for transforming include computer instructions for mapping a single metadata object in the native format of the source to a plurality of metadata objects in the common format.

11. The computer program product of claim 8, wherein a query associated with a data management computer program product is processed using the metadata object in the common format.

12. The computer program product of claim 11, wherein the query is processed by one or more of the following: a parser, a planner, an executor, or a language binder.

13. The computer program product of claim 8, wherein there is a plurality of metadata providers, each of which is configured, for a respective type of source, to send and transform for that source type.

14. The computer program product of claim 8, wherein there is a plurality of metadata providers, each of which is configured, for a respective instance of a source, to send and transform for that source instance.

15. A system, comprising:
a processor; and
a memory coupled with the processor, wherein the memory is configured to provide the processor with instructions which when executed cause the processor to:
  receiving a request for a metadata object, wherein the request includes a version number associated with the metadata object;
  using a processor to determine whether the metadata object is stored in a metadata cache, including by determining whether the metadata object having the version number included in the request is stored in the metadata cache;
  in the event it is determined the metadata object is not stored in the metadata cache, sending, to a source with which the metadata object is associated, a request, in a format associated with the source, to obtain the metadata object;
  transforming the metadata object from a native format of the source into a common format, if the metadata object as provided by the source is in a native format that is not the same as the common format; and
  providing access to the metadata object in the common format, including by providing the version number.

16. The system of claim 15, wherein the metadata cache includes one or more of the following: metadata objects associated with a plurality of data management systems or metadata objects associated with a plurality of types of data management systems.

17. The system of claim 15, wherein the instructions for transforming include instructions for mapping a single metadata object in the native format of the source to a plurality of metadata objects in the common format.

18. The system of claim 15, wherein a query associated with a data management system is processed using the metadata object in the common format.

19. The system of claim 18, wherein the query is processed by one or more of the following: a parser, a planner, an executor, or a language binder.

20. The system of claim 15, wherein there is a plurality of metadata providers, each of which is configured, for a respective type of source, to send and transform for that source type.

21. The system of claim 15, wherein there is a plurality of metadata providers, each of which is configured, for a respective instance of a source, to send and transform for that source instance.

22. A computer program product, the computer program product being embodied in a non-transitory computer readable storage medium and comprising computer instructions for:
  receiving a request for a metadata object, wherein the request includes a version number associated with the metadata object;
  using a processor to determine whether the metadata object is stored in a metadata cache, including by determining whether the metadata object having the version number included in the request is stored in the metadata cache;
  in the event it is determined the metadata object is not stored in the metadata cache, sending, to a source with which the metadata object is associated, a request, in a format associated with the source, to obtain the metadata object;
  transforming the metadata object from a native format of the source into a common format, if the metadata object as provided by the source is in a native format that is not the same as the common format; and
  providing access to the metadata object in the common format, including by providing the version number.

23. The computer program product of claim 22, wherein the metadata cache includes one or more of the following: metadata objects associated with a plurality of data management computer program products or metadata objects associated with a plurality of types of data management computer program products.

24. The computer program product of claim 22, wherein the computer instructions for transforming include computer instructions for mapping a single metadata object in the native format of the source to a plurality of metadata objects in the common format.

25. The computer program product of claim 22, wherein a query associated with a data management computer program product is processed using the metadata object in the common format.

26. The computer program product of claim 25, wherein the query is processed by one or more of the following: a parser, a planner, an executor, or a language binder.

27. The computer program product of claim 22, wherein there is a plurality of metadata providers, each of which is configured, for a respective type of source, to send and transform for that source type.

28. The computer program product of claim 22, wherein there is a plurality of metadata providers, each of which is configured, for a respective instance of a source, to send and transform for that source instance.

* * * * *